United States Patent
Mudrick et al.

(10) Patent No.: US 9,219,378 B2
(45) Date of Patent: Dec. 22, 2015

(54) WIRELESS CHARGING OF DEVICES

(75) Inventors: Adam A. Mudrick, San Diego, CA (US); Kevin D. Lee, San Diego, CA (US); Zhen Ning Low, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 630 days.

(21) Appl. No.: 13/047,698

(22) Filed: Mar. 14, 2011

(65) Prior Publication Data

US 2012/0104867 A1     May 3, 2012

Related U.S. Application Data

(60) Provisional application No. 61/409,067, filed on Nov. 1, 2010.

(51) Int. Cl.
*H02J 17/00*    (2006.01)
*H02J 7/02*     (2006.01)

(52) U.S. Cl.
CPC . *H02J 7/025* (2013.01); *H02J 17/00* (2013.01)

(58) Field of Classification Search
None
See application file for complete search history.

(56) References Cited

U.S. PATENT DOCUMENTS

| | | | |
|---|---|---|---|
| 7,443,135 B2 | 10/2008 | Cho | |
| 7,626,365 B2 * | 12/2009 | Patino et al. | 320/138 |
| 8,427,102 B2 * | 4/2013 | Hanley et al. | 320/108 |
| 8,460,816 B2 * | 6/2013 | Julstrom | H01F 38/14 |
| | | | 429/121 |
| 8,552,597 B2 * | 10/2013 | Song | H02J 1/102 |
| | | | 307/104 |
| 9,065,284 B2 * | 6/2015 | Malpas | A61B 5/0002 |
| 2005/0254183 A1 * | 11/2005 | Ishida et al. | 361/18 |
| 2006/0259098 A1 | 11/2006 | Erickson et al. | |
| 2008/0079392 A1 | 4/2008 | Baarman et al. | |
| 2008/0157603 A1 | 7/2008 | Baarman et al. | |
| 2009/0072782 A1 | 3/2009 | Randall | |
| 2009/0127937 A1 * | 5/2009 | Widmer et al. | 307/149 |
| 2009/0133942 A1 * | 5/2009 | Iisaka et al. | 178/43 |
| 2010/0164458 A1 * | 7/2010 | Pollard | 323/284 |
| 2010/0231170 A1 * | 9/2010 | Davis et al. | 320/136 |
| 2011/0210620 A1 * | 9/2011 | Shinoda et al. | 307/104 |

FOREIGN PATENT DOCUMENTS

| | | | | |
|---|---|---|---|---|
| CN | 1204177 | A | 1/1999 | |
| CN | 101442221 | A | 5/2009 | |
| CN | 101790828 | A | 7/2010 | |
| DE | 20016655 | U1 * | 2/2002 | G08C 17/02 |
| EP | 0865141 | A2 | 9/1998 | |
| EP | 1022840 | A2 | 7/2000 | |
| JP | H10257681 | A | 9/1998 | |

(Continued)

OTHER PUBLICATIONS

International Search Report and Written Opinion—PCT/US2011/058391—ISA/EPO—Aug. 24, 2012.

*Primary Examiner* — Rexford Barnie
*Assistant Examiner* — David Shiao
(74) *Attorney, Agent, or Firm* — Knobbe, Martens, Olson & Bear LLP

(57) ABSTRACT

Exemplary embodiments are directed to wireless power charging. A device may include at least one sensing element for measuring at least one parameter within a receiver configured to receive wirelessly transmitted power. The device may include a switching element configured to enable the receiver to convey energy to a load when the at least one parameter exceeds a threshold value.

32 Claims, 9 Drawing Sheets

(56) References Cited

FOREIGN PATENT DOCUMENTS

| | | |
|---|---|---|
| JP | 11040208 A | 2/1999 |
| JP | 2000166129 A | 6/2000 |
| JP | 2007537688 A | 12/2007 |
| JP | 2008236968 A | 10/2008 |
| JP | 2010148210 A | 7/2010 |
| WO | WO-0159951 A1 | 8/2001 |
| WO | 2006128037 A2 | 11/2006 |
| WO | WO2009081115 A1 | 7/2009 |
| WO | WO 2009081115 A1 * | 7/2009 |
| WO | WO-2010035545 A1 | 4/2010 |
| WO | WO 2010035546 A1 * | 4/2010 |

* cited by examiner

WIRELESS CHARGING OF DEVICES

CLAIM OF PRIORITY UNDER 35 U.S.C. §119

This application claims priority under 35 U.S.C. §119(e) to:

U.S. Provisional Patent Application No. 61/409,067 entitled "DYNAMIC UNDER VOLTAGE LOCKOUT FOR WIRELESS CHARGING RECEIVERS" filed on Nov. 1, 2010, the disclosure of which is hereby incorporated by reference in its entirety.

BACKGROUND

1. Field

The present invention relates generally to wireless power. More specifically, the present invention relates to a wireless power receiver, charging thereof, and detection of invalid devices by a wireless power transmitter.

2. Background

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus a rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

In a conventional wireless charging system, it may be difficult to determine if a device to be charged, such as a mobile telephone, is placed optimally within a charging region of a wireless power transmitter. If the chargeable device is placed on an edge of the charging region, the chargeable device may not receive an adequate amount of power and, thus, may cause an error message (e.g., "incompatible charger") to be displayed. Further, if the wireless power transmitter attempts to charge with insufficient power, an oscillatory state may occur where the wireless power transmitter repeatedly attempts to charge the chargeable device. This may cause annoying beeps or a false sense of charging from a user's perspective.

A need exists for methods, systems, and devices for wireless power receivers configured to enter a charging state upon determining that a sufficient amount of power is available from an associated wireless power transmitter. Moreover, a need exists for a wireless power transmitter configured to detect invalid devices positioned within a charging region of the transmitter.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The term "wireless power" is used herein to mean any form of energy associated with electric fields, magnetic fields, electromagnetic fields, or otherwise that is transmitted between a transmitter and a receiver without the use of physical electrical conductors. Hereafter, all three of these will be referred to generically as radiated fields, with the understanding that pure magnetic or pure electric fields do not radiate power. These must be coupled to a "receiving antenna" to achieve power transfer.

Figure 1:
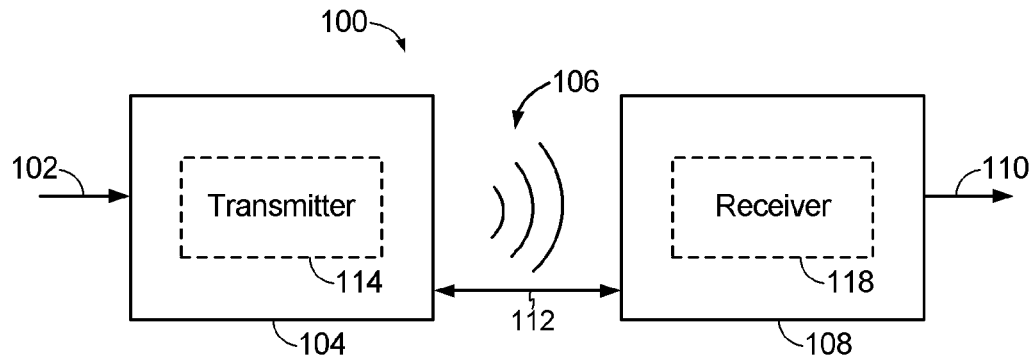
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a field 106 for providing energy transfer. A receiver 108 couples to the field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
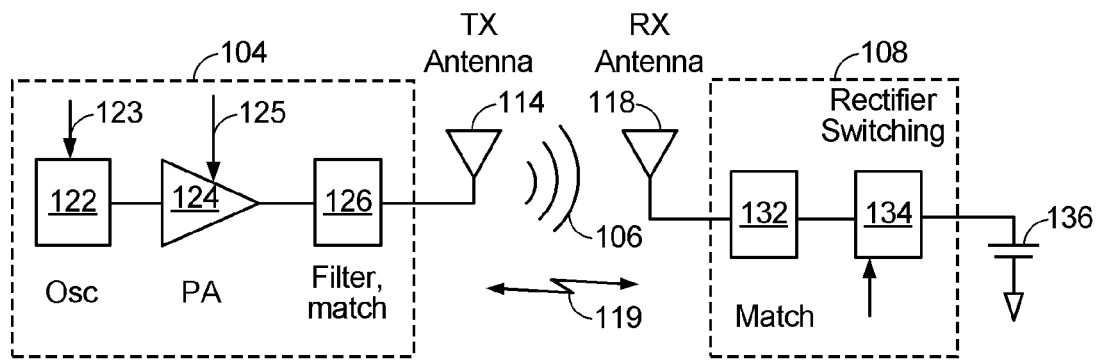
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate at a desired frequency, such as 468.75 KHz, 6.78 MHz or 13.56 MHz, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth® wireless technology, ZigBee® wireless technology, cellular, etc.).

As described more fully below, receiver 108, which may initially have a selectively disablable associated load (e.g., battery 136), may be configured to determine whether an amount of power transmitted by transmitter 104 and received by receiver 108 is sufficient for charging battery 136. Further, receiver 108 may be configured to enable a load (e.g., battery 136) upon determining that the amount of power is sufficient.

Figure 3:
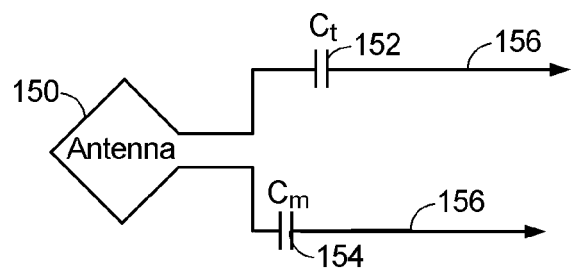
FIG. 3 illustrates a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Figure 4:
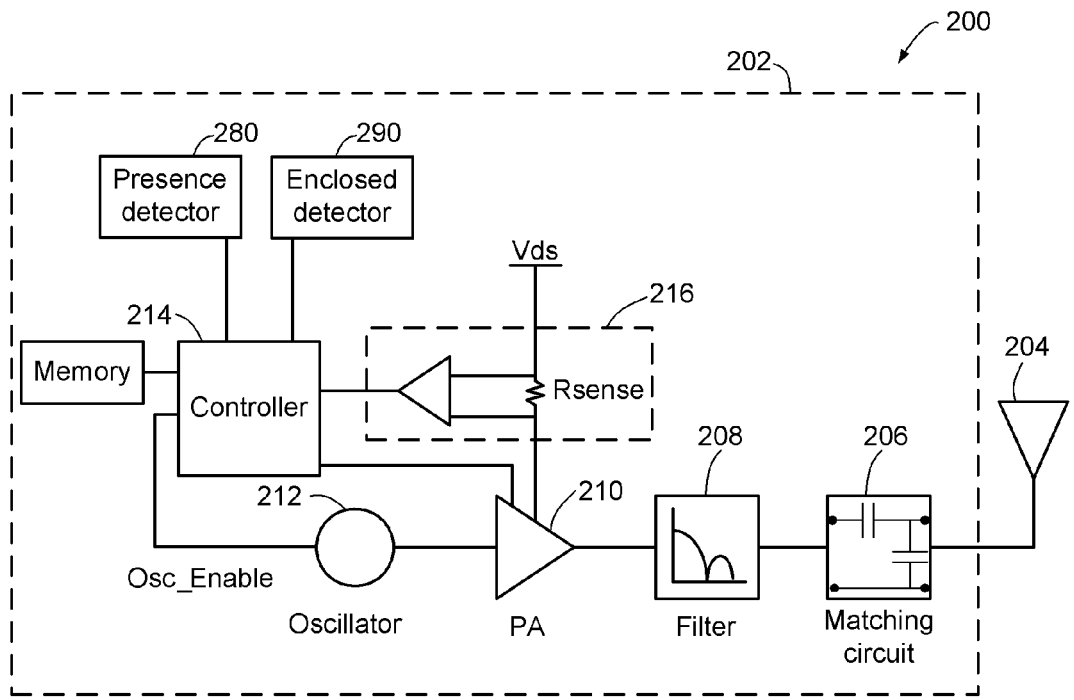
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. It is noted that transmitter 200 may operate at any suitable frequency. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current drawn by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency or phase of the oscillator, and for adjusting the output power level for implementing a communication protocol for interacting with neighboring devices through their attached receivers. It is noted that the controller 214 may also be referred to herein as processor 214. As is well known in the art, adjustment of oscillator phase and related circuitry in the transmission path allows for reduction of out of band emissions, especially when transitioning from one frequency to another.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy and to communicate with an active receiver. As described more fully below, a current measured at power amplifier 210 may be used to determine whether an invalid device is positioned within a charging region of transmitter 200.

Transmit antenna 204 may be implemented with a Litz wire or as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 290 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
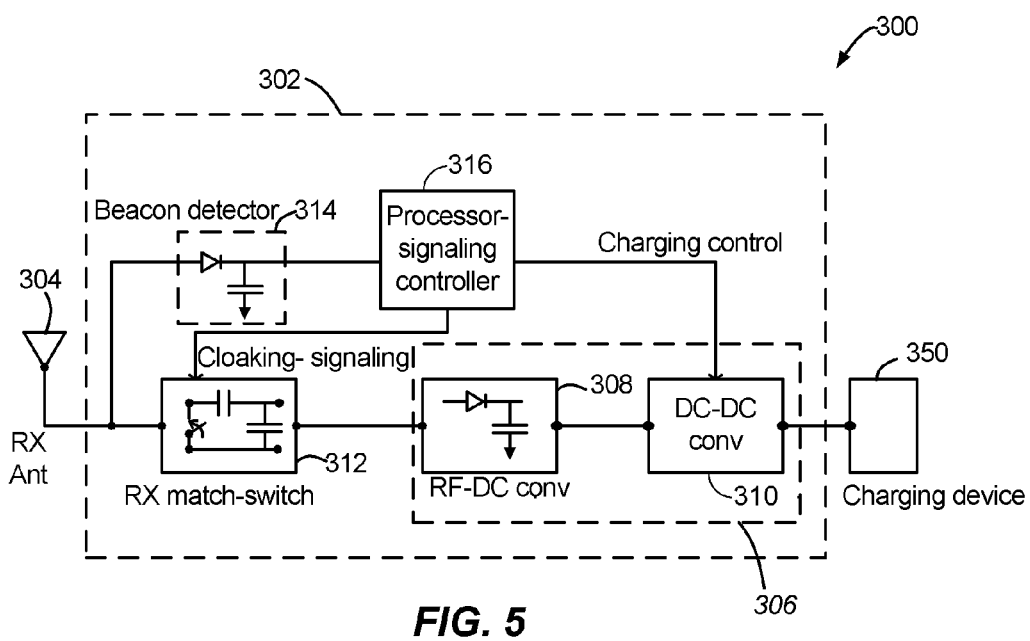
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or within a specified range of frequencies, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking" Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a device sensing and charging control mechanism, rather than conventional two-way communication. In other words, the transmitter may use on/off keying of the transmitted signal to adjust whether energy is available in the near-field. The receivers interpret these changes in energy as a message from the transmitter. From the receiver side, the receiver may use tuning and de-tuning of the receive antenna to adjust how much power is being accepted from the near-field. The transmitter can detect this difference in power used from the near-field and interpret these changes as a message from the receiver. It is noted that other forms of modulation of the transmit power and the load behavior may be utilized.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Various exemplary embodiments of the invention, as described herein, relate to a receiver, which is configured for dynamic under voltage lockout based on one or more circuit parameters, such as, for example only, a rectified voltage, or an output power. More specifically, various exemplary embodiments relate to a wireless power receiver, which is configured to enter a charging state if a parameter within the receiver (e.g., a rectifier voltage or an output voltage) is greater than a threshold value. Yet more specifically, according to one exemplary embodiment, a wireless power receiver may measure an associated rectifier voltage and compare the rectifier voltage to a pre-determined threshold voltage. If the measure voltage is less than the threshold voltage, a switching element (e.g., charging field-effect transistor (FET)) within the wireless power receiver will remain in an OFF configuration to disable an associated load (e.g., decouple the load from the receiver). If the measured voltage is greater than the threshold voltage for a time period (e.g., 1 second), the switching element may transition to an ON configuration, thus, enabling the load (e.g., couple to load to the receiver). Moreover, if the measured voltage drops below the threshold voltage for a time period (e.g., 5 seconds), the switching element may again transition to an OFF configuration. The voltage may be periodically measured and compared to the threshold voltage to determine whether the switching element should be in an ON or OFF configuration. The threshold voltage value may be dependent on a current within the wireless power receiver (e.g., an output current). Accordingly, this invention may minimize or eliminate false positive charging messages. Associated methods, as described more full below, are also contemplated.

According to another exemplary embodiment, as described more fully below, a wireless power transmitter may be configured to detect invalid devices positioned within a charging region of the wireless power transmitter. More specifically, transmitter may be configured to detect an invalid receiver by detecting a change in current at the transmitter.

Figure 6:
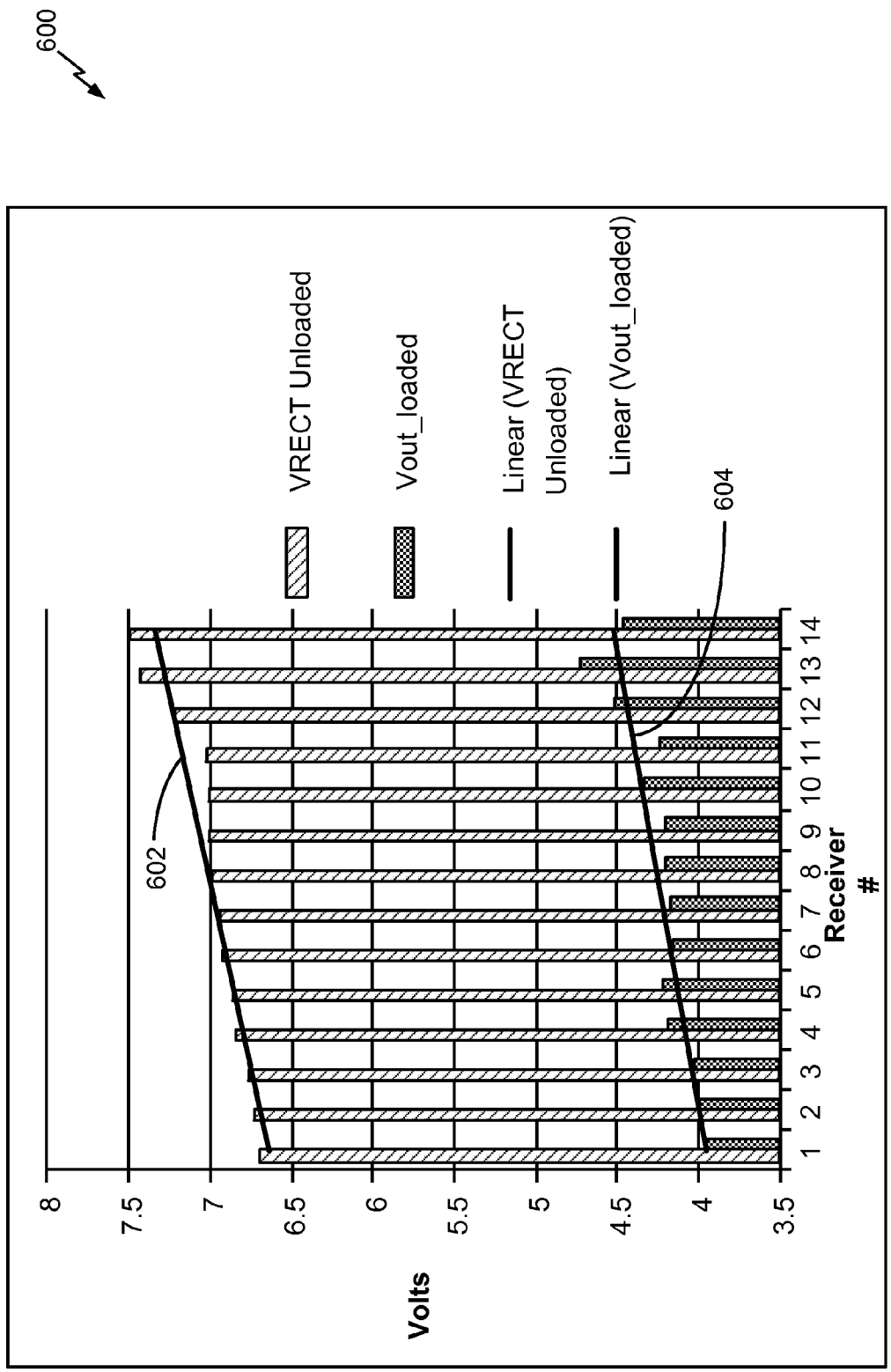
FIG. 6 is a plot illustrating various voltage levels of a plurality of receivers positioned on a charging device.

FIG. 6 is a plot 600 illustrating various voltage levels (i.e., an unloaded rectifier voltage VRECT Unloaded and a loaded output voltage Vout_loaded) of a plurality of receivers positioned on a charging device (e.g., a charging pad). It is noted that the unloaded rectifier voltage VRECT Unloaded is a voltage at a rectifier of a receiver while the receiver is decoupled from a load (i.e., the load is disabled). Further, the output voltage Vout_loaded is an output voltage of the receiver while the receiver is coupled to the load (i.e., the load is enabled). As illustrated in plot 600, VRECT Unloaded correlates with Vout_loaded. More specifically, a linear representation of VRECT Unloaded, which is indicated by reference numeral 602, correlates with a linear representation of Vout_loaded, which is indicated by reference numeral 604. Therefore, as will be appreciated by a person having ordinary skill in the art, an unloaded rectifier voltage of a receiver may be used to predict a loaded output voltage of the receiver.

Figure 7B:
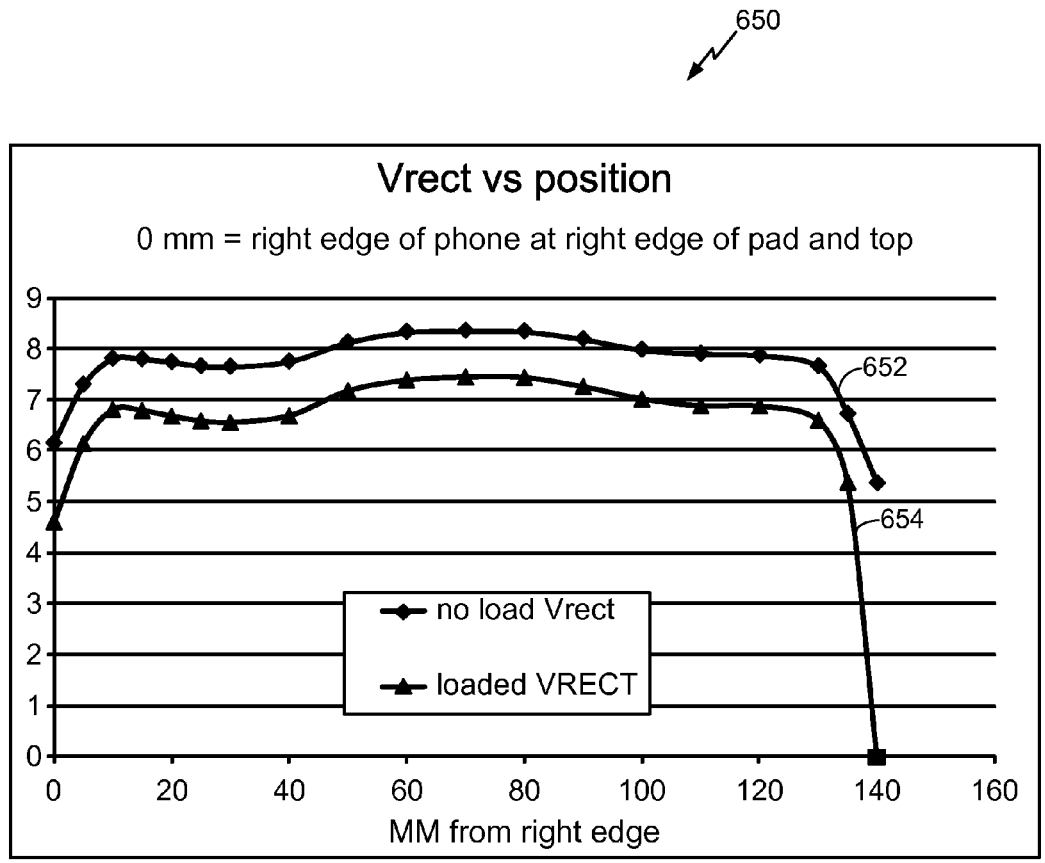
FIG. 7B is a plot illustrating a rectifier voltage of a receiver in comparison to a position of the receiver on a charging pad.
Figure 7A:
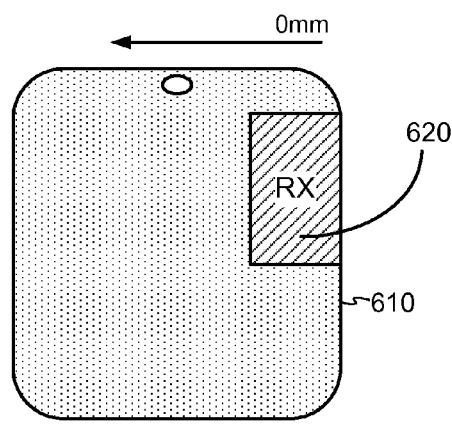
FIG. 7A illustrates a charging pad and a receiver positioned thereon.

FIG. 7A illustrates a charging pad 610 and a receiver 620 positioned thereon. As illustrated in FIG. 7A, receiver 620 is positioned, for example, on a right side edge of charging pad 620. FIG. 7B is a plot 650 illustrating a rectifier voltage of receiver 620 (see FIG. 7A) in comparison to various positions of receiver 620 on charging pad 610. Signal 652 represents an unloaded rectifier voltage "no load Vrect" and signal 654 represents a loaded rectifier voltage "loaded VRECT." As illustrated in plot 650, signal 652 correlates with signal 654. Furthermore, as also illustrated, if a receiver is placed substantially 0-10 mm from an edge of the charging pad, a rectifier voltage substantially decreases and, therefore, the receiver may not be able to receive enough power for a sufficient charge.

Figure 8:
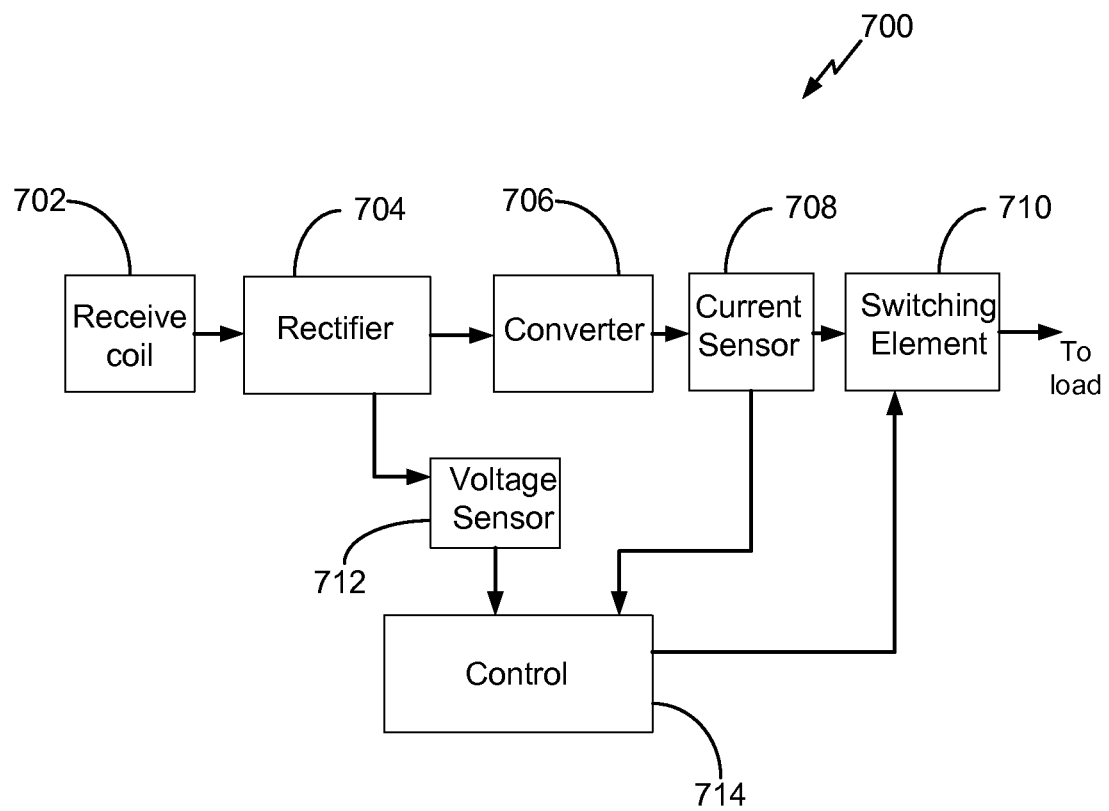
FIG. 8 is a block diagram of a receiver, in accordance with an exemplary embodiment of the present invention.

With reference to FIG. 8, a portion of a receiver 700, according to an exemplary embodiment of the present invention, is illustrated. Receiver 700 includes a receive coil 702, a rectifier 704, a power converter 706 (e.g., a DC-to-DC converter), a current sensor 708, a switching element 710, a voltage sensor 712, and a control device 714. Control device 714 may comprise any suitable control device, such a processor, a controller, or the like, including the controller 316 of FIG. 5. Voltage sensor 712 is configured to measure a rectifier voltage (VRECT) and convey rectified voltage VRECT to control device 714. Current sensor 710 is configured to measure a current output from converter 706 and convey the measured current to control device 714. By way of example only, switching element 710 may comprise a field-effect transistor (FET). Switching element 710 may be configured to selectively couple an output of converter 706 to a load.

A contemplated operation of receiver 700, in accordance with an exemplary embodiment of the present invention, will now be described. Initially, switching element 710 may be in an OFF configuration and, therefore, a load associated with receiver 700 is disabled. According to one exemplary embodiment, upon being positioned within a charging region of a wireless power transmitter (e.g., transmitter 202 of FIG. 4), voltage sensor 712 may measure a voltage at rectifier 704 and convey the measured rectifier voltage to control 714. Control 714 may then compare the rectifier voltage to a predetermined unloaded threshold rectifier voltage. If the measure voltage is less than the unloaded threshold rectifier voltage, switching element 710 may remain in an OFF configuration (i.e., the load may remain disabled). If the measured voltage is greater than the unloaded threshold rectifier voltage for a time period (e.g., 1 second), control 714 may cause (e.g., via a control signal) switching element 710 to transition to an ON configuration, thus, enabling the load (e.g., couple the load to receiver 700). The voltage may be periodically measured and compared to loaded threshold rectifier voltage to determine whether the switching element should be in an ON or OFF configuration. Moreover, if the measured voltage drops below the loaded threshold rectifier voltage for a time period (e.g., 5 seconds), switching element 710 may again transition to an OFF configuration.

According to another exemplary embodiment, upon being positioned within a charging region of a wireless power transmitter (e.g., transmitter 202 of FIG. 4), current sensor 708 may measure a current at an output of converter 706 and convey the measured current to control 714. The current may be periodically measured and used to determine a degree of loading (e.g., fully loaded, partially loaded). One or more associated threshold, for example a rectified voltage, may be used according to the degree of loading. Stated another way, the current measurement is used to determine the amount of loading (e.g., from unloaded to fully loaded) and then control element 714 may set the appropriate threshold level based on the degree of loading.

It is noted that receiver 700 may use a one or more measured parameters (e.g., a voltage, power) in determining whether a sufficient amount of power is available for an adequate charge. It is further noted that receiver 700, upon determining that an adequate amount of power is available for a sufficient charge, may notify the associated transmitter (e.g., via communication means) that charging may begin or has begun.

Additionally, it is noted that the threshold parameters (i.e., the unloaded rectifier voltage, the loaded rectifier voltage, the unloaded threshold current, and the loaded threshold current may be pre-determined (e.g., via testing) to ensure existence of adequate power. For example, if two watts of power is required to adequately charge a device, the device may be tested to determined loaded and unloaded threshold values that may ensure that at least two watts of power may be received. It is further noted that the threshold values may vary depending on loading conditions (i.e., the type and/or size of an associated load or the state of charge of a battery powered device).

Figure 9A:
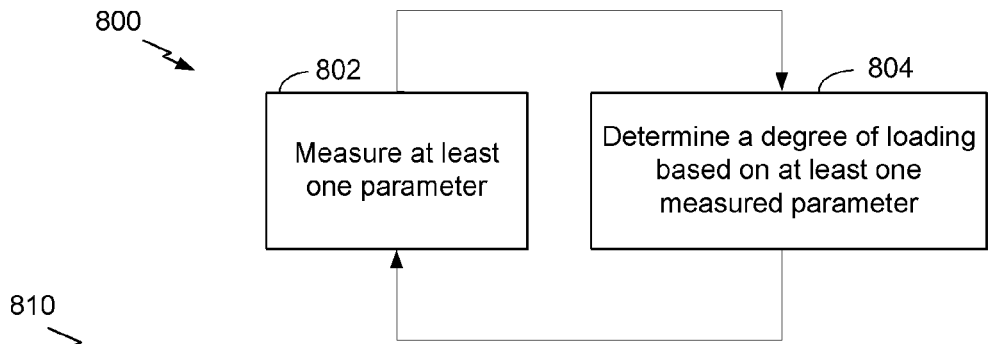
FIGS. 9A and 9B are flowcharts illustrating various methods, in accordance with exemplary embodiments of the present invention.
Figure 9B:
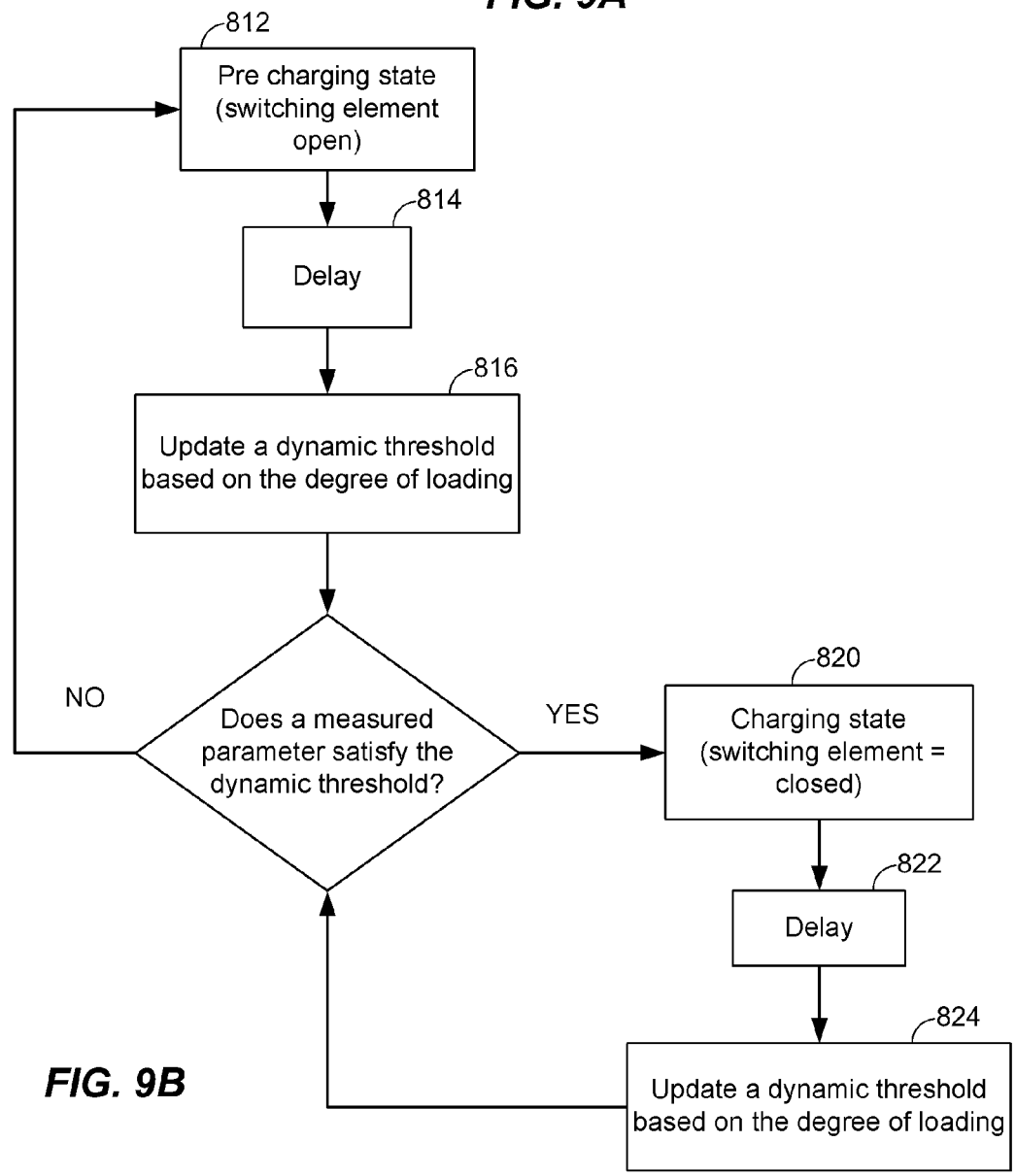

FIGS. 9A and 9B are flowcharts illustrating respective methods 800 and 810, according to various exemplary embodiments of the present invention. It is noted that methods 800 and 810 may occur simultaneously. Method 800 may include measuring an initial parameter, such as an output current, (depicted by numeral 802) and comparing the results to a static threshold to determine a degree of loading (depicted by numeral 804). The degree of loading is used to set the threshold levels (i.e., dynamic threshold levels) of additional parameters. The measured parameters are then compared to the dynamic thresholds. If the measured parameter satisfies (i.e., is greater than or equal to) the dynamic threshold, charging may commence or continue.

Method 810 may include entering a pre-charging state wherein a load is decoupled from a rectifier of a chargeable device via a switching element, such as a charging FET (depicted by numeral 812). Further, method 810 may include waiting for a time period (e.g., 1 second) after entering the pre-charging state (depicted by numeral 814). It is noted that the rectifier voltage may be continuously or periodically measured and compared to the dynamic threshold voltage. Further, method 810 may include updating a dynamic threshold based on a degree of loading (depicted by numeral 816), which is determined in step 804 of method 800. If the rectifier voltage is determined to not satisfy the dynamic threshold voltage (e.g., the rectifier voltage is less than the dynamic threshold voltage), method 800 may revert to step 812. If the measured rectifier voltage is determined to satisfy the dynamic threshold voltage (e.g., the measured rectifier voltage is equal to or greater than the dynamic threshold voltage), method 810 includes entering a charging state wherein a load is coupled to a rectifier of the chargeable device via the switching element (depicted by numeral 820). Further, method 810 may include waiting for a time period (e.g., 1 second) after entering the charging state (depicted by numeral 822). Method 810 may also include updating a dynamic threshold based on a degree of loading (depicted by numeral 824), which is determined in step 804 of method 800.

Figure 10:
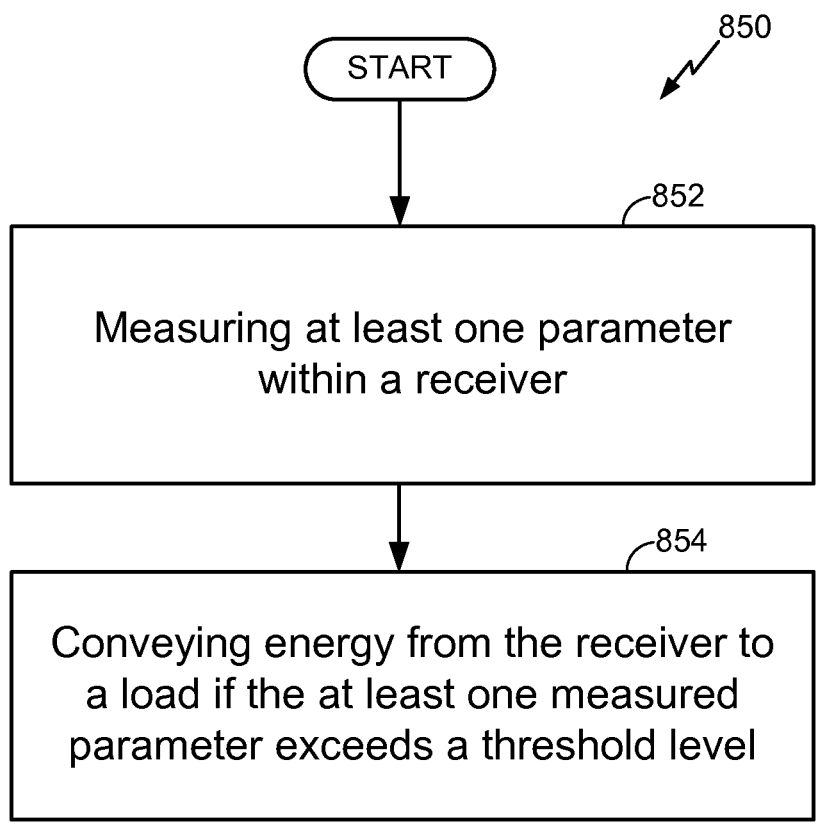
FIG. 10 is a flowchart illustrating another method, in accordance with an exemplary embodiment of the present invention.

FIG. 10 is a flowchart illustrating another method 850, in accordance with one or more exemplary embodiments. Method 850 may include measuring at least one parameter within a receiver (depicted by numeral 852). Further, method 850 may include conveying energy from the receiver to a load if the at least one measured parameter exceeds a threshold value (depicted by numeral 854).

As will be appreciated by a person having ordinary skill in the art, wireless power, which is transmitted from a wireless power transmitter, may be received by an invalid device (e.g., a NFC card). In accordance with another exemplary embodiment, a wireless power transmitter (e.g., transmitter 202 of FIG. 4) may be configured to detect when an invalid device is positioned within an associated charging region. More specifically, according to one exemplary embodiment, a valid receiver (i.e., a valid device) may include a disabled load upon being positioned within a charging region of a wireless power transmitter. More specifically, the receiver may be decoupled from a load via a switching element, such as switching element 710 illustrated in FIG. 8. Therefore, the power drawn from the valid receiver is minimal (i.e., the current at a power amplifier of the transmitter may not change substantially). Furthermore, upon a valid device being positioned within a charging region of a wireless power transmitter, the valid device may convey a message to the wireless power transmitter indicating its presence. Further, if an invalid device is positioned within the charging region, a current at the power amplifier of the wireless power transmitter may increase substantially. Accordingly, upon detection of the increase in current, the wireless power transmitter may determine that an invalid device is positioned within the charging region and, in response thereto, transition to a low power error state (i.e., a power level of the transmitter may be reduced). In the event the wireless power transmitter does not detect an invalid receiver, the wireless power transmitter may increase a voltage at the power amplifier, which increases an amount of power delivered to a valid receiver positioned within the charging region.

Figure 11:
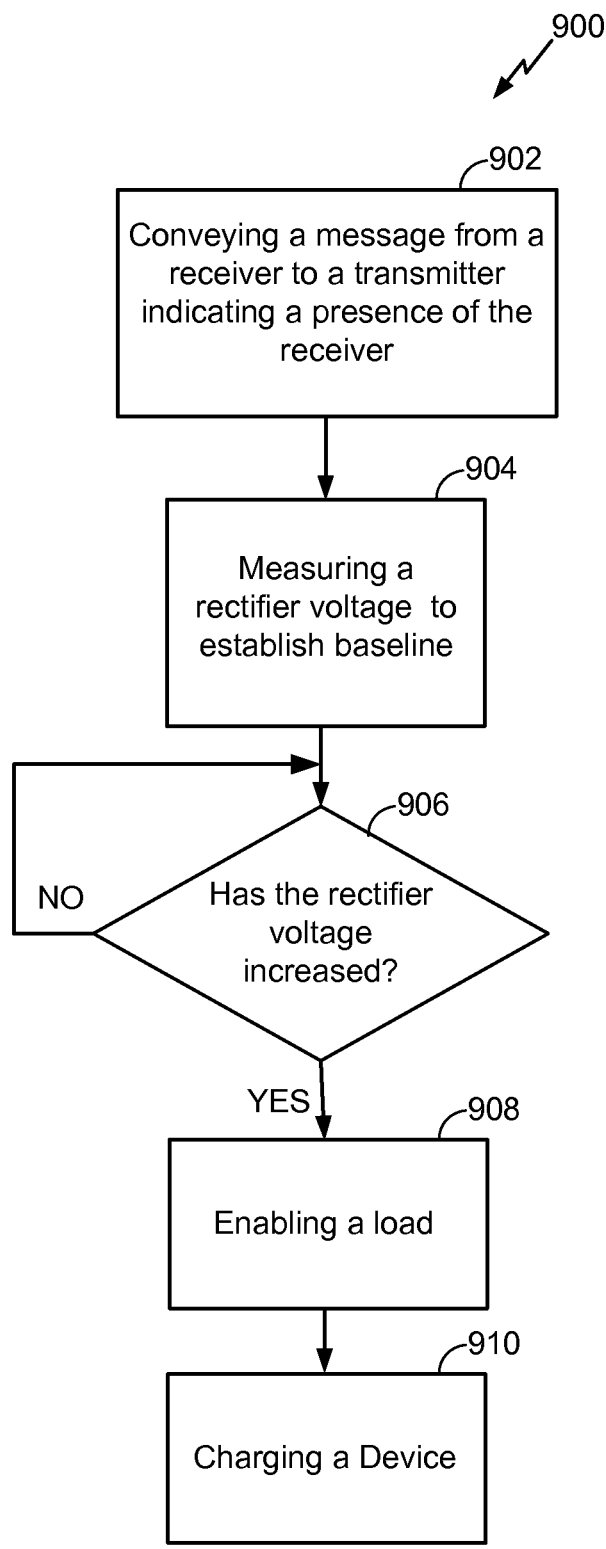
FIG. 11 is a flowchart illustrating another method, in accordance with an exemplary embodiment of the present invention.
Figure 12:
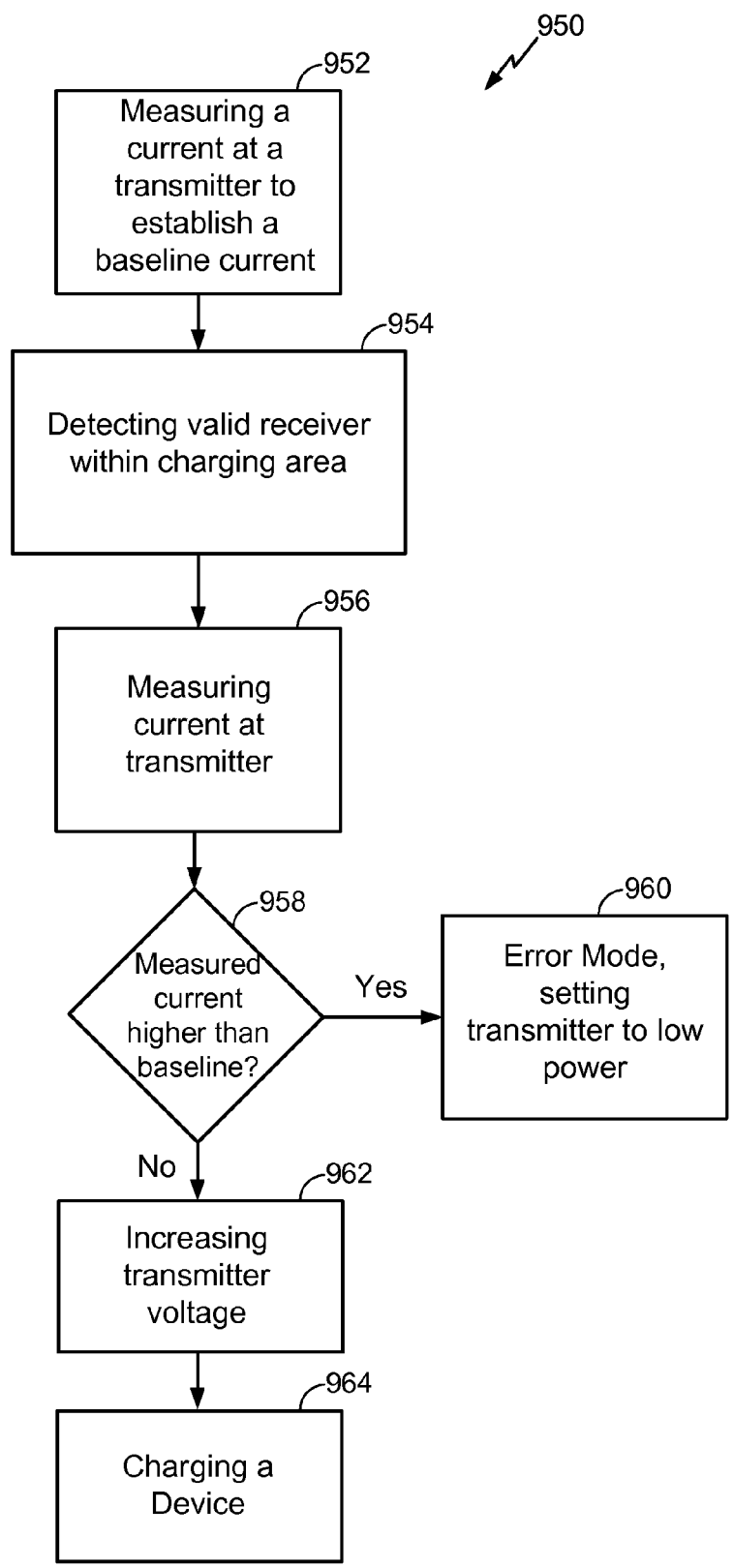
FIG. 12 is a flowchart illustrating yet another method, in accordance with an exemplary embodiment of the present invention.

FIGS. 11 and 12 are additional flowcharts illustrating methods of a charging scenario between a transmitter and a receiver, wherein method 900 of FIG. 11 is associated with the receiver and method 950 of FIG. 12 is associated with the transmitter. FIG. 11 is a flowchart illustrating a method 900, in accordance with one or more exemplary embodiments. Method 900 may include conveying a message from a receiver, which has a disabled load, to an associated transmitter indicating the presence of the receiver (depicted by numeral 902). Further, method 900 may include measuring a rectifier voltage to establish a baseline rectifier voltage (depicted by numeral 904). Method 900 may further include comparing a current rectifier voltage to the baseline rectifier voltage to determine whether the rectifier voltage has increased (depicted by numeral 906). If the rectifier voltage has increased, method 900 proceeds to step 908 where a load is enabled. Thereafter, in step 910, a device associated with the receiver may be charged. If the rectifier voltage has not increased, method 900 reverts back to step 906.

FIG. 12 is a flowchart illustrating a method 950, in accordance with one or more exemplary embodiments. Method 950 may include measuring a baseline current at a transmitter (depicted by numeral 952). Further, method 950 may include detecting a valid receiver positioned within an associated charging region (depicted by numeral 954). By way of example, the valid receiver may be detected by receiving a signal from the valid receiver. Method 950 may also include measuring a current at the transmitter (depicted by numeral 956) and determining whether the measured current is higher than the baseline current (depicted by numeral 958). If the measured current is higher than the baseline current, an invalid device likely exists within the charging region and the transmitter may transition to an error mode, wherein an amount of power transmitted is decreased (depicted by numeral 960). If the measured current is not greater than the baseline current, the transmitter may increase a transmitter voltage (depicted by numeral 962) and a device associated with the detected valid receiver may be charged (depicted by numeral 964).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A device, comprising:
   a receive coil configured to receive wirelessly transmitted power from a power transmitter when the receive coil is in a charging region of the power transmitter;
   a rectifier coupled to the receive coil;
   at least one sensing element configured to measure at least one parameter from the rectifier, the at least one parameter indicative of an amount of power available to be received from the power transmitter;
   a switching element configured to convey energy from the rectifier to a load when the at least one parameter is greater than a threshold value; and
   a control device coupled to the at least one sensing element, the control device configured to convey a control signal to the switching element based at least in part on the at least one parameter and to determine the threshold value based on a degree of loading of the device.

2. The device of claim 1, the at least one sensing element comprising a voltage sensor coupled to the control device and an output of the rectifier.

3. The device of claim 1, the switching element comprises a field-effect transistor.

4. The device of claim 1, the at least one sensing element comprising a voltage sensor coupled to an output of the rectifier.

5. The device of claim 1, wherein the control device is further configured to notify a wireless power transmitter of at least one of a state of the switching element or a presence of a wireless power receiver.

6. The device of claim 5, the control device configured to compare the at least one parameter to the threshold value.

7. The device of claim 6, the threshold value dependent on a type of the load, a size of the load, or both a type and a size of the load.

8. The device of claim 5, the control device configured to convey the control signal to the switching element to enable the switching element to convey energy to the load if the at least one parameter exceeds the threshold value for at least a time duration.

9. The device of claim 5, the control device configured to convey the control signal to the switching element to enable the switching element to not convey energy to the load if the at least one parameter is less than the threshold value for at least a time duration.

10. The device of claim 1, further including a power converter having an output coupled to a current sensor.

11. The device of claim 1, the switching element configured to convey energy to a load upon an increase in a voltage of the rectifier.

12. The device of claim 1, further comprising a power converter coupled to an output of the rectifier and a current sensor coupled to an output of the power converter and to the control device, wherein the current sensor is configured to convey a measured current to the control device, the measured current indicative of the degree of loading.

13. A method, comprising:
    measuring at least one parameter of a rectifier within a receiver, the at least one parameter indicative of an amount of power available to be received from a wireless power transmitter;
    conveying energy from the rectifier to a load if the at least one parameter is greater than a threshold value; and
    determining the threshold value by a control device based on a degree of loading of the receiver.

14. The method of claim 13, further comprising comparing the at least one parameter to the threshold value.

15. The method of claim 13, the measuring comprising measuring a voltage at an output of the rectifier within the receiver.

16. The method of claim 15, further comprising comparing the measured voltage to the threshold value.

17. The method of claim 13, the measuring comprising measuring a current at an output of a power converter within the receiver.

18. The method of claim 13, further comprising notifying a wireless power transmitter of at least one of whether energy is being conveyed from the receiver to the load or a presence of a wireless power receiver.

19. The method of claim 13, further comprising coupling the load to the receiver if a voltage of the rectifier of the receiver increases.

20. The method of claim 13, further comprising sensing a current at the wireless power transmitter and decreasing an amount of power transmitted from the wireless power transmitter if the current increases prior to conveying energy from the receiver to a load.

21. The method of claim 13, further comprising measuring the at least one parameter while the load is decoupled from the rectifier.

22. The method of claim 13, further comprising decoupling the receiver from the load if the at least one parameter is less than the threshold value for at least a time duration.

23. The method of claim 13, further comprising coupling the receiver to the load if the at least one parameter is greater than the threshold value for at least a time duration.

24. The method of claim 13, further comprising conveying a message to an associated transmitter if the at least one measured parameter is equal to at least the threshold value to enable the transmitter to convey an existence of a charging process.

25. The method of claim 13, further comprising determining the degree of loading by measuring an output of a power converter coupled to an output of the rectifier.

26. The method of claim 13, wherein determining the threshold value comprises determining the threshold value while energy is conveyed from the rectifier to the load and determining the threshold value while energy is not conveyed from the rectifier to the load.

27. A device, comprising:
    means for receiving and rectifying wirelessly transmitted power;
    means for measuring at least one parameter of the receiving and rectifying means, the at least one parameter indicative of an amount of power available to be received from a wireless power transmitter;

means for conveying energy from the receiving and rectifying means to a load, the conveying energy means configured to convey energy from the receiving and rectifying means to the load if the at least one parameter is greater than a threshold value; and means for determining the threshold value based on a degree of loading of the receiving and rectifying means.

28. The device of claim 27, further comprising means for comparing the at least one parameter to the threshold value.

29. The device of claim 27, further comprising means for selectively decoupling the load from the receiving and rectifying means if the at least one measured parameter is less than the threshold value and selectively coupling the load to the receiving and rectifying means if the at least one measured parameter exceeds the threshold value.

30. The device of claim 27, further comprising means for determining the degree of loading.

31. The device of claim 27, wherein the conveying means has a first state in which the conveying means is configured to convey energy from the receiving and rectifying means to a load and a second state in which the conveying means is configured to not convey energy from the receiving and rectifying means to the load, the determining means configured to determine the threshold value while the conveying means is in the first state and to determine the threshold value while the conveying means is in the second state.

32. A device, comprising:
a receive coil configured to receive wirelessly transmitted power from a power transmitter when the receive coil is in a charging region of the power transmitter;
a rectifier coupled to the receive coil;
at least one sensing element configured to measure at least one parameter from the rectifier, the at least one parameter indicative of an amount of power available to be received from the power transmitter;
a switching element configured to convey energy from the rectifier to a load when the at least one parameter satisfies a threshold value condition; and
a control device coupled to the at least one sensing element, the control device configured to convey a control signal to the switching element based at least in part on the at least one parameter and to determine a threshold value of the threshold value condition based on a degree of loading of the device, wherein the switching element has a first state in which the switching element is configured to convey energy from the receiver to a load and a second state in which the switching element is configured to not convey energy from the rectifier to the load, the control device configured to determine the threshold value while the switching element is in the first state and to determine the threshold value while the switching element is in the second state.

* * * * *